United States Patent
Brochu et al.

[11] Patent Number: 5,376,210
[45] Date of Patent: Dec. 27, 1994

[54] PEELING AIDS FOR LPB ELECTROLYTES AND METHOD OF USE

[75] Inventors: Fernand Brochu, Longueuil; Michel Duval, Montréal, both of Canada

[73] Assignee: Hydro-Quebec, Montreal, Canada

[21] Appl. No.: 216,415

[22] Filed: Mar. 23, 1994

[51] Int. Cl.$^5$ ............................................. B32B 35/00
[52] U.S. Cl. .................... 156/344; 29/623.3; 429/192
[58] Field of Search ............... 156/344, 584; 29/623.1, 29/623.3; 429/192

[56] References Cited

U.S. PATENT DOCUMENTS

| | | |
|---|---|---|
| 3,205,183 | 9/1965 | Vandenberg et al. . |
| 4,303,748 | 12/1981 | Armand et al. . |
| 4,357,401 | 11/1982 | Andre et al. . |
| 4,450,213 | 3/1984 | Dey et al. ................ 29/623.1 X |
| 4,505,997 | 3/1985 | Armand et al. . |
| 4,578,326 | 3/1986 | Armand et al. . |
| 4,818,964 | 4/1989 | Wong . |
| 4,882,828 | 11/1989 | McLoughlin et al. ............. 29/623.1 |
| 5,100,746 | 3/1992 | Muller et al. .................. 29/623.3 X |

FOREIGN PATENT DOCUMENTS

| | | |
|---|---|---|
| 1269702 | 5/1990 | Canada . |
| WO92/02966 | 2/1992 | WIPO . |

*Primary Examiner*—Mark Osele
*Attorney, Agent, or Firm*—Oblon, Spivak, McClelland, Maier & Neustadt

[57] ABSTRACT

Peeling of an LPB amorphous electrolyte from its coating substrate or protective film is carried out by introducing a non-polar solvent, based on at least one aliphatic or cycloaliphatic hydrocarbon containing about 5 to 15 carbon atoms, between the electrolyte and its substrate or protective film. It is thus possible to suddenly and easily separate the substrate or the protective film from the electrolyte without pulling off any amount thereof.

15 Claims, 1 Drawing Sheet

PEELING AIDS FOR LPB ELECTROLYTES AND METHOD OF USE

BACKGROUND OF INVENTION a) Field the Invention

The invention concerns processing aids for peeling LPB electrolytes. More particularly, the invention relates to a method for peeling LPB amorphous electrolytes from their coating substrates or protective films.

b) Description of Prior Art

Lithium/polymer electrolyte batteries (hereinafter designated LPB) are manufactured by laminating three main types of films: a film of a positive electrode containing an electrochemically active material such as vanadium oxide, a film of electrolyte made of a polymer and a salt of lithium, and a film of lithium. Each of these films has a thickness between 15 and 50 μm, for a total thickness of elementary film of the battery of 100 to 150 μm. About 30 meters of elementary film, 15 cm wide, are typically required to give a battery of 100 Wh.

The films of electrolyte are prepared, for example, by coating a solution of polymer and lithium salt on a plastic substrate of the polypropylene type, and evaporating the solvent in a drying tunnel. A protective film of polyethylene is then placed on the electrolyte, before winding it into a roll, in order to prevent the electrolyte from adhering to the back of the polypropylene substrate. A roll of positive electrode is prepared separately by solvent coating, with a polyethylene protective film also applied, then the two rolls are brought to a laminator. The polyethylene protective films are peeled off and the electrolyte is laminated to the positive electrode. The polypropylene substrate is then peeled off from the electrolyte/positive electrode laminate, and a film of lithium is laminated on top of the electrolyte to give a complete LPB cell.

With crystalline electrolytes, made for example of polyethylene oxide and non-plasticizing lithium salts, such as lithium perchlorate or lithium trifluorosulfonate, peeling is rather easy. However, with highly amorphous electrolytes, containing for example copolymers or highly plasticizing salts of the TFSI type (lithium trifluorosulfonimide), it is practically impossible to peel the polypropylene substrate without pulling off some of the electrolyte, because of the very adhesive character of the latter.

Substrates less adhesive and less polar than polypropylene, such as FEP (fluorinated ethylene propylene copolymer) or polyethylene (PE), cannot be used, because either they are not wetted properly by the electrolyte solutions (in the case of FEP), or they will stretch or deform in the drying tunnel (PE), or they are still too adhesive to be peeled off without damage to the electrolyte.

Internal additives known to facilitate peeling, such as silicone derivatives, also cannot be used in the electrolytes, because of their detrimental effect on the electrochemical properties of the cell.

Cooling the electrolyte films before peeling, at temperatures lower than −60° C. (the glass transition temperature of the electrolytes), somewhat facilitates peeling, but not enough to enable a very uniform peeling on the entire surface and at a speed acceptable for industrial applications.

SUMMARY OF INVENTION

It is an object of the invention to use peeling aids based on aliphatic or cycloaliphatic hydrocarbons, for example, of the heptane type, which are electrochemically compatible, dramatically modify the surface properties of the interface between the electrolyte and its substrate or protective film, thus allowing an easy and fast peeling.

More specifically, the invention concerns a method for peeling an LPB electrolyte from its substrates or protective films, characterized in that a peeling aid, including at least one non-polar solvent based on at least one $C_5$ to $C_{15}$ aliphatic or cycloaliphatic hydrocarbon, is introduced between the electrolyte and the substrate or between the electrolyte and the protective film, resulting in the separation (peeling) of the substrate or of the protective film from the electrolyte.

These peeling aids can be used with the electrolyte films containing the families of polymers described in Armand U.S. Pat. No. 4,303,748, as well as in more detail in U.S. Pat. Nos. 4,578,326 and 4,357,401 and Canadian Patent No. 1,269,702. They consist, for example, of amorphous copolymers and terpolymers, which are cross-linkable or not. The latter are not commercially available presently, and can be synthesized, for example, with coordination type catalysts of the type described in Vandenberg U.S. Pat. No. 3,205,183 (September 1965).

These peeling aids also apply to the electrolytes containing the families of lithium salts described in Armand U.S. Pat. No. 4,303,748, as well as to the more complex salts based on lithium trifluorosulfonimide (TFSI) or lithium bishalogeno acyl or sulfonylimide (TFSM) cross-linkable or not, described in U.S. Pat. Nos. 4,505,997 and 4,818,694 and PCT WO92/02966 of Jul. 25, 1991.

The peeling aids of the invention are obviously not necessary with electrolytes which are easy to peel from their coating substrates or protective films, for example, electrolytes based on crystalline polymer or non-plasticizing lithium salts. They are required, however, with the highly amorphous or highly plasticized electrolytes which are used in modern LPB batteries.

The peeling aids of the invention generally enable to peel amorphous, salt-containing electrolytes from coating substrates and protective films consisting of relatively non-polar material such as polypropylene (not corona-treated), polyethylene, FEP (fluorinated ethylene copolymers), TEFLON (or silicone rubbers, as well as those covered with a thin layer of these materials. They do not normally or very hardly enable to peel salt-containing electrolytes from polar substrates such as glass, polyester, polyamide, aluminum or nickel. In the case of amorphous electrolytes which do not contain a salt, said peeling aids enable to peel most of the non polar and polar substrates and protective films. These examples of substrates and protection films which are peelable or non peelable substrates with the peeling aids of the invention should be considered as typical and not limiting, and may vary depending on the types of electrolytes used.

Non polar solvents based on aliphatic and cycloaliphatic hydrocarbons containing from 5 to 15 carbon atoms may be used as peeling aids, those containing 7 carbon atoms (heptane or cycloheptane) giving the best results. Compounds containing less than 7 carbon atoms evaporate too rapidly and are less efficient. Those which contain more than 8 carbon atoms are slower to evaporate after peeling. Aromatic and polar solvents have no effect on peeling.

The method according to the invention may be carried out by introducing the peeling aid dropwise at the interface between the electrolyte and its substrate or protection film to be peeled. The introduction of the peeling aid may be carried out by means of a syringe or a micro-pump. The web of electrolyte with its substrate and/or protective film is passed around a peeling roll, and the separation of the electrolyte is carried out on the peeling roll, by the addition of the peeling aid at the rate of 1 to 5 drops per cm of web displacement (for a width of the web of about 15 cm).

More specifically, according to a preferred embodiment, a few drops of peeling aid are first introduced, by means of a syringe or any other dispersing device, at the interface between the electrolyte and the substrate or protection film to be peeled. Once the separation of the two films is initiated, peeling is continued easily by adding, regularly a few drops of peeling aid and pulling on each of the films separately. Very small quantities of peeling aid are required for maintaining the separation of the films, the only thing required being that there is a sufficient vapor tension of the peeling aid along the separation line.

BRIEF DESCRIPTION OF DRAWINGS

The invention is illustrated without being restricted by the annexed drawings in which.

DESCRIPTION OF PREFERRED EMBODIMENTS

Figure 1:
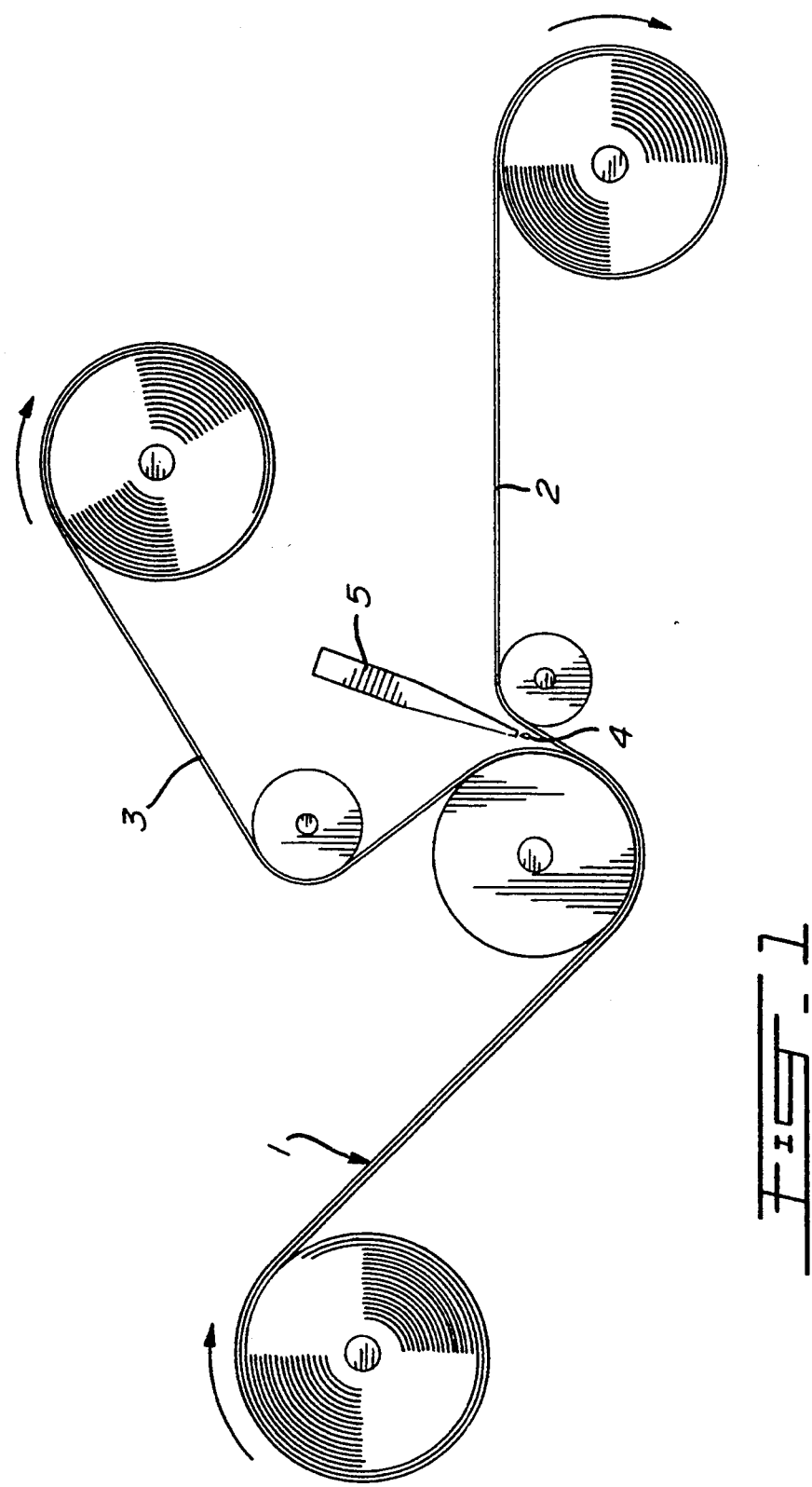
FIG. 1 is a schematic illustration of a set-up enabling to peel the electrolyte.

The mechanisms of adhesion of the amorphous LPB electrolyte to its substrates or protection films, and of its non-adhesion in the presence of the peeling aid are not well known, but could be the following:

The adhesion of the amorphous electrolyte to its substrates or protection films could be due to the highly flexible chains of polymer extending themselves in the manner of tentacles at the surface of the substrate or of the protection film, and anchoring to its asperities. In the presence of heptane, which is a non-solvent for the electrolytes, the polymer chains are subjected to a force inducing them to switch from the extended to the retracted ball form. In the case of non-polar supports, they could do that by pulling out of the asperities and separating (peeling) from the surface. In the case of polar substrates, the chains of salted electrolyte would remain anchored by absorption to the polar surface and could not be detached (peeled) therefrom.

The invention is illustrated but is not limited by the following examples.

EXAMPLE 1

A solution of electrolyte is prepared by dissolving 100 g of LPB copolymer (M~235,000) and 22 g of lithium salt TFSI in a solvent mixture of acetonitrile toluene (80:20) at a concentration of 0.128 g/ml of solution. This solution is coated by means of a doctor blade so as to give a film about 30 μm thick after evaporation of the solvents, on the following coating substrates: TEFLON ® (polytetrafluoroethylene) (100 μm), DuPont FEP ®-Type A (fluorinated ethylene propylene copolymer—50 μm), Toray bi-oriented polypropylene (outer side non corona treated, interior side treated—5 μm), polyethylene (100 μm), silicone-treated polypropylene from 3M (25 μm), Mylar ® polyester (15 μm), Reynolds aluminum foil (shining side—13 μm), glass plate (1 mm). A LPB positive electrode, prepared on an aluminum metallic collector, is laminated on the electrolyte, then the coating substrates are peeled from the electrolyte. It is observed that even with relatively non polar substrates, parts of the electrolyte remain on the substrate after peeling, in increasing quantities from TEFLON to FEP, non-treated polypropylene, polyethylene, and silicone non-treated polypropylene. With polar substrates (polyester, corona-treated polypropylene, glass and aluminum), the totality of the electrolyte and even sometimes of the positive electrode, remains on the substrate.

EXAMPLE 2

Example 1 is repeated by cooling first the electrolyte at a temperature lower than −60° C. with liquid nitrogen. Peeling is carried out more easily than previously but there still remains some electrolyte on the substrates, either on their entire surface or around anchoring spots.

EXAMPLE 3

Example 1 is repeated by introducing a drop of heptane between the electrolyte and its substrates, by means of a syringe and a needle. The substrates which are relatively non-polar (TEFLON, FEP, non-treated or silicone-treated polypropylene, polyethylene) are suddenly and easily separated from the electrolyte and are peeled without pulling off any electrolyte. The polar substrates (polyester, corona-treated polypropylene, glass and aluminum) remain firmly attached to the electrolyte.

EXAMPLE 4

One of the multi-layered films 1 of Example 1, consisting of a positive electrode (with its metallic collector—not shown), an electrolyte, which is laminated on said positive electrode, and the coating substrate 2 of the electrolyte (non-treated polypropylene), is placed on a peeling machine of the type illustrated in FIG. 1. The peeling of the substrate is initiated by a drop of heptane 4, dispensed by the syringe 5 as in Example 3. The peeled substrate 2 and the remaining film 3 of positive electrode/electrolyte laminate are sent to two separate winding rolls. A dropwise addition of heptane is maintained to the peeling interface as film 1 is unwound. The amounts of heptane required depend on the nature of the polymer, and typically vary from 1 to 5 drops per cm of displacement of the film 1 (for a width of the film of 15 cm). If the flow is too low, some electrolyte may start to be pulled off from the substrate. If it is too high, an excess of heptane may flow below the positive electrode and separate it from its aluminum collector.

We claim:

1. Method for peeling an LPB electrolyte from its coating substrate or protective film, in which said electrolyte is separated from said substrate or said protective film, wherein a peeling aid consisting of at least one non-polar solvent based on at least one aliphatic or cycloaliphatic hydrocarbon containing about 5 to 15 carbon atoms is introduced between said electrolyte and said substrate or between said electrolyte and said protective film, as peeling is being carried out by separation of said substrate or said protective film from said electrolyte.

2. Method according to claim 1, wherein the electrolyte is amorphous and contains copolymers and highly plasticizing lithium salts.

3. Method according to claim 2, wherein the amorphous electrolyte contains salts of the lithium trifluorosulfonimide type.

4. Method according to claim 1, wherein said substrate consists of polypropylene.

5. Method according to claim 1, wherein said protective film consists of polyethylene.

6. Method according to claim 2, wherein the electrolyte consists of amorphous copolymers or terpolymers which are cross-linkable or non-crosslinkable.

7. Method according to claim 2, wherein the substrate and the protective film consist of non-polar materials.

8. Method according to claim 7, wherein the non-polar materials are selected from non-corona treated polypropylene, polyethylene, FEP, polytetrafluoroethylene, silicone rubbers, as well as those covered with a thin layer of these materials.

9. Method according to claim 1, wherein the electrolyte does not contain plasticizing lithium salts.

10. Method according to claim 9, wherein the electrolyte consists of amorphous copolymers or terpolymers which are crosslinkable or non crosslinkable.

11. Method according to claim 9, wherein the substrate and the protective film consist of non-polar and polar materials.

12. Method according to claim 1, wherein the peeling aid comprises heptane or cycloheptane.

13. Method according to claim 1, which comprises introducing the peeling aid dropwise, at the interface between the electrolyte and its substrate or its protective film to be peeled.

14. Method according to claim 13, wherein the introduction of the peeling aid is carried out by means of a syringe or a micro-pump.

15. Method according to claim 14, which comprises passing the web of electrolyte with its substrate and/or its protective film around a peeling roll, separating the electrolyte from its substrate or protective film on the peeling roll, and introducing the peeling aid at the rate of 1 to 5 drops per cm of web displacement, for a web width of about 15 cm.

* * * * *